United States Patent [19]
Zandstra et al.

[11] 3,862,084
[45] Jan. 21, 1975

[54] PREPARATION OF POLYETHYLENE TEREPHTHALATE CONTAINING INORGANIC FILLERS

[75] Inventors: Bertrus H. Zandstra; Jan Bosman, both of Arnhem, Netherlands

[73] Assignee: Akzona Incorporated, Asheville, N.C.

[22] Filed: July 9, 1971

[21] Appl. No.: 161,316

[30] Foreign Application Priority Data
July 10, 1970 Netherlands...................... 7010296

[52] U.S. Cl................................................ 260/40 P
[51] Int. Cl............................................... C08g 51/04
[58] Field of Search... 260/40 R, 40 P, 37 P, 37 NP, 260/37 R, 75 T

[56] References Cited
UNITED STATES PATENTS

| | | | |
|---|---|---|---|
| 2,571,319 | 10/1951 | Waters et al. | 260/40 P |
| 3,372,138 | 1/1968 | Bowman et al. | 260/40 P |
| 3,487,041 | 12/1969 | Okuzumi | 260/40 P |

OTHER PUBLICATIONS

Modern Plastics Encyclopedia, 1965 (Sept., 1964), Vol. 42, No. 1A, McGraw-Hill, Inc., pages 417–419 and 631.

Primary Examiner—Morris Liebman
Assistant Examiner—S. M. Person
Attorney, Agent, or Firm—Francis W. Young

[57] ABSTRACT

A process for the preparation of polyethylene terephthalate containing one or more inorganic fillers comprising heating chips of the amorphous polyethylene terephthalate to a temperature in the range between approximately 5°C. below and approximately 27°C. above the glass transition point ($T_g$) of the said polymer and mixing inorganic filler with the softened polymer.

1 Claim, No Drawings

PREPARATION OF POLYETHYLENE TEREPHTHALATE CONTAINING INORGANIC FILLERS

The invention relates to a process for the preparation of a polymer having a basis of polyethylene terephthalate which polymer is provided with an inorganic filler.

In general there are two methods of providing polyethylene terephthalate with the desired fillers. In one method the fillers are added during the preparation of the polymer, for instance, as a glycol dispersion during the transesterification of dimethylterephthalate with glycol. One disadvantage of said method is for example that on changing over from one pigment to an other the apparatus used for the preparation of the polymer must be thoroughly cleaned in order to avoid obtaining polymer not having the desired colour or colour shade. Another disadvantage is that it prohibits the use of fillers that are sensitive to temperature or moisture. The choice of suitable fillers is further limited in that care must be taken to prevent process interruptions through interaction of the applied fillers, which may be coated or not, and, for instance, the catalyst.

According to the other method the filler is at a temperature of approximately 280° to 300°C. mixed with the molten polymer during the processing thereof. Said method has the disadvantage that the distribution of the filler in the polyethylene terephthalate is not quite homogeneous, which may cause the resulting objects to have less favourable mechanical properties, and a less attractive appearance. Another disadvantage is that amounts of filler of more than approximately 2% by weight, can only be added by using very costly equipment.

The invention provides a simple method of mixing an inorganic filler with polyethylene terephthalate without this having a deteriorating influence on the properties of the polymer or leading to the production of large quantities of undesirable polymer after a change in the amount and/or nature of the filler applied. The method also permits rapid and easy change-over to a different type of filler composition. Another advantage is that more suitable fillers are available. An important advantage is, moreover, that the filler may be added in relatively large amounts of, say, 20% by weight or more, for instance of 25 or 30% by weight, calculated on the polyethylene terephthalate, without this giving rise to any difficulty.

The method according to the invention for the preparation of a polymer having a basis of polyethylene terephthalate which polymer is provided with an inorganic filler, is characterized in that chips of the amorphous polymer are heated to a temperature in the range between approximately 5°C. below and approximately 27°C. above the glass transition point ($T_g$) of the polyethylene terephthalate and the inorganic filler is mixed with the softened polymer.

At temperatures more than approximately 5°C. below the glass transition point the polyethylene terephthalate is so hard that it is virtually impossible to mix the inorganic filler with the chips. At temperatures more than approximately 27°C. above the glass transition point the polyethylene terephthalate starts crystallizing, so that it likewise becomes too hard. The use of temperatures in the range between 5°C. below and 27°C above the glass transition point permits rapid and easy admixing of relatively large amounts of the inorganic filler without the risk of the chips sticking together, and accurate setting of the temperature. But, if desired, the temperature of the chips may during the mixing treatment be temporarily raised or lowered, so that it comes to lie outside the afore-mentioned range. Where use is made of polyethylene glycol terephthalate the chips of amorphous polyethylene glycol terephthalate are generally heated to a temperature between 70°C. and 99°C., but preferably between 78° and 93°C., because in this range the amorphous polyester is sufficiently softened and the crystallization rate of the polyester is so low that also during the mixing treatment the polyester will remain sufficiently soft.

The time required for mixing the chips and the fillers may vary between wide limits and is dependent on, for instance, the mixing temperature and the amount of filler to be added. The mixing time is generally chosen to be at least between 10 minutes and 6 hours, but preferably between 15 minutes and 1 hour.

The amount of inorganic filler to be added to the polymer chips using the method according to the invention may in general be as high as 10 to 15% by weight calculated on the polymer, without this involving the need for extraordinarily long mixing times. The filler may also be added in larger amounts of, say, 20 or 30% by weight calculated on the polymer. It is preferred to add it in an amount of at least 2 to approximately 15% by weight. By inorganic filler is to be understood here a solid substance which is insoluble in the solid polyethylene terephthalate, for instance inorganic pigments such as carbon black, titanium oxide, iron oxide, cadmium selenide, microchalk, kaolin and barium sulphate, and inorganic reinforcing fibres such as glass or asbestos fibres.

Mixtures of the afore-mentioned fillers are likewise applicable. The fillers may be of the reinforcing or non-reinforcing type and they may be coated, if desired. The preferred filler is a colouring or non-colouring pigment such as rutile titanium dioxide, calcium carbonate, or silicates.

In general use may be made of any method that is suitable to be applied for mixing the inorganic filler and the polyethylene terephthalate. It is preferred that the mixing of the chips and the filler should take place in a heatable and rotatable drum, more particularly a drum filled with balls.

By polyethylene terephthalate are to be understood here the homopolymer from ethylene glycol terephthalate as well as copolyesters from terephthalic acid and/or one or more different acids such as isophthalic acid, azelaic acid, phenyleneindane dicarboxylic acid and from ethylene glycol and/or one or more different alcohols such as neopentyl glycol, hexanediol-1,6 and pentaerylithritol. The polyethylene terephthalate has a relative viscosity of at least 1.60, measured on a 1% by weight solution in metacresol at 25°C.

The amorphous polyethylene terephthalate is amorphous, or its crystallinity is so low that at the mixing temperature applied in the process according to the invention the polymer softens or at least is sticky. The crystallinity must in general not be higher than approximately 12%. This can be determined in a known manner by measuring the chip density, for instance 100% amorphous polyethylene glycol terephthalate has a density of 1.335 g/cm$^3$, 100% crystalline polyethylene glycol terephthalate has a density of 1.455 g/cm$^3$. Interpolation will give the percent crystallinity in the polymer.

The chips of amorphous polyethylene terephthalate may be obtained by any method that is suitable to be used, for instance by cutting the polymer as it leaves the polycondensation reactor. The term "chips of polyethylene terephthalate" is meant to include here granulated, pelletized or differently shaped polyethylene terephthalate having a minimum dimension of approximately 0.5 mm.

Already before being mixed with the inorganic filler, the chips of polyethylene terephthalate may contain various compounds, for instance polymers such as polyamides, ethylene vinyl acetate copolymers, polypropylene and poly-4-methylpentene-1, UV-stabilizers, antioxidants, lubricants, and anti-static agents. Or the polymer may have been pre-mixed with part of the filler to be added according to the invention, which may be the part usually present in the finished polymer.

The chips of amorphous polyethylene terephthalate to which the inorganic filler has been added by the method according to the invention may, if desired, be heated to a temperature between 95° and 238°C. in order to raise the relative viscosity by postcondensation in the solid state, generally at reduced pressure. The postcondensation process is found to proceed far more rapidly and effectively for chips obtained by the process according to the invention than for non-filled polyethylene terephthalate or polymer filled by the known method. This is illustrated by the fact that if the starting material used is polyethylene terephthalate having a relative viscosity of 1.60 and containing 15% by weight of titanium dioxide, the time required for heating the polymer at the postcondensation temperature is only one third of that required for heating non-filled polyethylene terephthalate. Another advantage is that the chips made from this polymer show smaller inside-to-outside differences in relative viscosity, which is proof that the polymer has a very homogeneous viscosity.

The chips of amorphous polyethylene terephthalate obtained by the process according to the invention and, if desired, subsequently heated at a temperature between 95° and 238°C., may be shaped into objects such as sheets, films, tubes and bars, using the techniques generally known in the art.

EXAMPLE 100 parts by weight of polyethylene glycol terephthalate chips having a relative viscosity of 1.65 (measured on a 1% by weight solution in metacresol at 25°C.) and 15 parts by weight of rutile titanium dioxide are placed in a rotatable vacuum dryer. The dryer is equipped with a device for measuring the temperature of the chips. The temperature of the fluid for heating the dryer is set to 238°C., which causes the chip temperature rapidly to rise to between 70° and 99°C. This temperature is maintained for a period of 20 minutes. The dryer is then opened for examination of the chips. Almost all of the filler is found to be taken up by the polymer chips. Despite the fact that the temperature of the heating fluid had been set to 238°C. there are no stuck chips.

For the purpose of comparison the experiment is repeated, except that use is now made of chips of polyethylene glycol terephthalate to which in a preliminary step the titanium dioxide had been added, by means of an extruder. After the dryer has been opened, the chips are found to be fully stuck. The dryer must be cleaned by boiling it out with ethylene glycol, as a result of which the polymer is lost.

What is claimed is:

1. A process for the preparation of polyethylene terephthalate polymer containing inorganic filler in which process amorphous polyethylene terephthalate chips and inorganic filler are mixed and heated to a temperature within the range between approximately 5° C. below and approximately 27° C. above the glass transition point of said polyethylene terephthalate polymer, almost all of said inorganic filler being taken up by the resulting softened polymer chips, wherein said inorganic filler is mixed with said polymer in an amount of 2% to 30% by weight based on the polymer.

* * * * *